Oct. 29, 1968     A. E. BURCH     3,407,504
YIELDING AND INDICATING CALIPER
Filed June 29, 1966
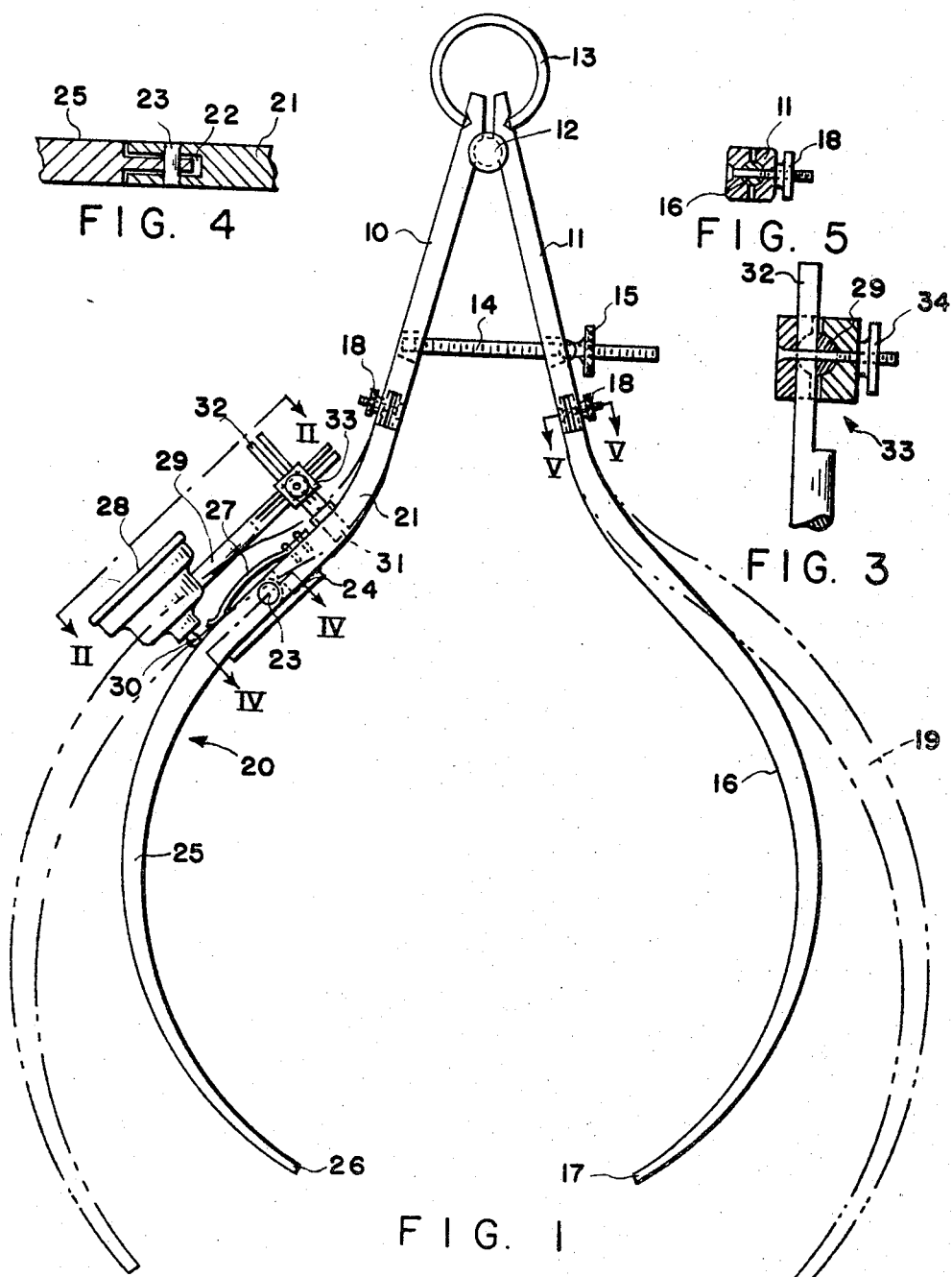
INVENTOR.
ANDREW E. BURCH
BY
*Francis J. Klempay*
ATTORNEY

United States Patent Office 3,407,504
Patented Oct. 29, 1968

3,407,504
YIELDING AND INDICATING CALIPER
Andrew E. Burch, 199 Ohio St. NW.,
Warren, Ohio 44485
Filed June 29, 1966, Ser. No. 561,591
1 Claim. (Cl. 33—148)

ABSTRACT OF THE DISCLOSURE

A caliper having a pair of tines biased outwardly and adjustable by means of a screw and nut in which one of the tines is hinged so that its lower end portion may be moved outwardly relative to the other tine. The movable portion of the hinged tine is spring biased and provided with a stop member. A dial type indicator is mounted on the fixed portion of the hinged tine in such manner that its indicating point may be moved along the hinged portion of the tine.

---

This invention relates to an improved measuring caliper as used by machinists, for example, and has as its principal object the provision of such instrument having novel safety features and being of much wider versatility than similar devices heretofore proposed. As regards the safety feature, the invention provides an improved measuring or checking caliper which may be safely used on rotating work as on a lathe, for example, even when the work and the caliper used thereon is relatively large and heavy. This is accomplished, in accordance with the invention, by hinging a cantilevered portion of one of the legs or tines of the caliper while providing a yieldable biasing means tending to keep the legs or tines in relatively closed positions as determined by a setting of the conventional adjusting screw normally provided on such instruments. With this arrangement there is no danger in positioning the caliper over a revolving workpiece even though the screw setting of the caliper is such as to otherwise tend to bind the work to the caliper or vice versa. To lend utility to the assembly whereby the diametric or other distance sensed or measured may be determined by a subsequent reference to a linear scale or a micrometer while yet retaining the aforesaid safety feature, the above mentioned hinged joint is provided, in addition to the biasing means, with a positive stop rigidly fixed with respect to the unhinged portion of the leg or tine and which is adapted to be visually contacted by at least a section of the hinged portion of the leg or tine so that in adjusting the screw of the caliper the said hinged and unhinged portions may retain their precise relation upon removal from the work to allow the sensed or measured dimension to be determined or checked from a scale or micrometer.

A further object of the invention to provide a measuring instrument of the type briefly explained above wherein by the use of standardized and interchangeable parts the instrument may be readily rearranged for use with workpieces having different size ranges.

Another object of the invention is to provide a measuring instrument of the kind first generally outlined above which may be alternatively used to indicate the extent of taper in an elongated workpiece being turned or to better indicate the attainment of the proper positional relationship between the unhinged and hinged portions of the tine or leg of the caliper to thereby better assure accuracy in the reading of a diameter or other dimension as set by the above mentioned adjusting screw of the instrument.

The above and other objects and advantages of the invention will become apparent upon consideration of the following specification and the accompanying drawing wherein there is disclosed the preferred embodiment of the invention.

In the drawing:

FIGURE 1 is a side elevation of an assembled caliper embodying the principles of the present invention;

FIGURE 2 is a fragmentary end elevation of the device of FIGURE 1, looking in the direction of the arrows II—II of FIGURE 1;

FIGURE 3 is a sectional view taken along the line III—III of FIGURE 2; and

FIGURES 4 and 5 are sectional views taken along the lines IV—IV and V—V, respectively, of FIGURE 1.

In accordance with usual practice, the caliper of the present invention is comprised principally of two opposed jaws or tines carried at the free ends of rigid leg members 10 and 11 which are pivoted together adjacent one of their ends by a suitable hinge fixture 12. A stiff split compressive spring 13 fitting into notches in the leg members outwardly of the pivot 12 is provided to bias the free end portions of the leg members apart, and a connecting screw 14 having an adjustable thumb nut 15 is provided to controllably bring the free end portions of the leg members toward each other whereby the measuring or sensing extremities of the jaws or tines may be precisely varied as to spacing.

In the instrument of the present invention one of the jaws or tines (indicated by reference numeral 16) is a continuous member having a sensing end 17 and being detachably connected to the free end of the leg member 11 by a suitable slip-fitting including a lock nut 18. As indicated in FIGURES 1 and 5, and in accordance with known constructions for dividers and other drafting instruments the interconnection between the tine 16 and the leg member 11 is such that the tine can be rigidly fixed to the leg member without any possibility of swivelling between these parts and without any reasonable probability of sliding disengagement when the nut 18 is tightened. However, the interconnection is such that the tine may be readily removed and/or replaced to provide an instrument of different measuring and/or indicating capacity as to length or spread. Thus, a different shaped tine as indicated in dotted lines at 19 may be provided to increase the spread and length of the instrument.

In accordance with this invention, the opposite jaw or tine (indicated generally herein by the reference numeral 20) is formed of two parts, the first of which designated by numeral 21 is detachably fitted at one of its ends to the leg member 10 in the same manner as the tine 16 is fitted to the leg member 11. The opposite end of the part 21 is slotted at 22 and fitted across the slot with a hinged pin 23 as shown more clearly in FIGURE 4. Also, a stop plate 24 is rigidly secured to the said opposite end portion of the part 21 on the inside of the tine 20 by welding or brazing, and this bar 24 cantilevers outwardly to underlie the slot 22 in the part 21. Hinged on the pin 23 is the other part 25 of the composite tine 20, and it is apparent from FIGURES 1 and 4 that the inner edge of this end portion of the part 25 may be brought into flat limiting engagement with the outer flat surface of the plate 24. Part 25 has, at its outer free end, a work-engaging extremity 26, and a leaf spring 27 rigidly secured to part 21 and spanning the pin 23 is provided to engage the outer surface of the part 25 and yieldingly urge this latter part to such position that the plate 24 is firmly contacted.

From the above it will be understood that normally the parts 21 and 25 will act together as a single or one-piece tine to permit adjustment of the nut 15 to vary the spacing between the sensing and/or measuring points 17 and 26. However, the hinged joint between these parts 21 and 25 permits the part 25 bearing the point 26 to readily spring outwardly if any attempt is made to place the points 17 and 26 over a rotating workpiece in a lathe, for example, wherein the diameter to be checked or measured is greater than the distance between the points. This eliminates any danger of the caliper becoming damaged or being seized by the rotating workpiece with the consequent element of danger to the user. Further, the arrangement greatly facilitates the work of the user or machinist since he may first accurately preset the desired dimension between the points 17 and 26 by reference to a scale or a micrometer, and readily and more quickly make subsequent checks or readings on the workpiece as the same is being machined. Since the initial dimensional setting of the caliper is made with the underlying flat portion of the part 25 in lying contact with the outer flat surface of the plate 24 the machinist can readily observe, visually and instantaneously, during subsequent checks on the progress of the work the approach of such flat surface of part 25 to the stop plate 24 and thereby the approach of the desired dimension of the workpiece. Multiple referrals to scales and/or micrometers after initial setting of the caliper is thus avoided and much time is thereby saved. After short experience the machinist will know very precisely when the aforesaid flat inner portion of the part 25 closes onto the stop plate 24 thereby indicating that the proper dimensions between points 17 and 26 has been reached on the work.

To lend further facility in the use of the instrument herein disclosed I provide a small-diametered indicator 28 which, per se, is well known in the art, being commonly carried on an arm 29, and which has a work-contacting point 30 which is movable inwardly toward the face of the dial of the indicator. Assuming the arm 29 and/or the outer casing of the indicator 28 to be fixed, inward movement of the point 30 will be indicated on the dial of the indicator in steps of .001", all in accord with usual practice.

In accordance with this invention, I provide for the rigid but adjustable mounting of the indicator 28 on the fixed part 21 of the caliper tine 20 with the point 30 resting on the outer surface of the movable part 25 of the tine 20. For this purpose I provide an aperture 31 in the part 21 into which is slideably fitted an end portion of a support rod 32. The fit between bore 31 and rod 32 is snug and firm so that in normal use and once the rod 32 is applied there will be no movement between the rod and the part 21. As shown in FIGURES 1–3 the arm 29 is fitted at substantially right angles to the support rod 32 by a releasable fitting 33 having a clamp nut 34. When the latter is loosened the arm 29 may be slid longitudinally along its axis or it together with the fitting 22 may be slid longitudinally at right angles along the axis of arm 32. This allows the "zeroing-in" of the indicator 28, and the parts will remain in proper relative position upon subsequent re-tightening of the clamp nut 34.

It will be obvious that when the instrument is used in the manner above explained and upon the presetting of the instrument to the desired measurement with the spring 27 holding the part 25 against the stop plate 24 the indicator 28 may be set to read zero, for example. By experience or proper calibration, if desired, the machinist can then tell at a glance of the indicator the overage of the desired dimension of the workpiece being machined. This not only eliminates the necessity of sighting along the stop plate 24 but also aids the machinist in selecting the depth of the next or finish cut on the workpiece.

Also, this arrangement greatly reduces the probability of producing undersized parts, as will readily be appreciated by those familiar with the machinist's art.

Another important advantage of the arrangement of the invention involving the use of the indicator 28 is the ability to accurately measure and/or check tapers being cut on the workpieces. As explained above, the calibration of the instrument or the user's experience can be relied on to determine the distance between the points 17 and 26 when resting lightly on opposite surfaces of the workpiece or workpieces at various locations along the line of taper. By positioning the indicator point 30 close to the pivot 23, fairly large variations in the dimensions between the points 17 and 26 may be measured although at some expense of precision. If desired, the arm 29 may be substantially lengthened (and curved if desired or necessary) to place the point 30 much closer to the point 26 whereby sensings of movement of the latter with respect to point 17 may be made much more sensitive. Ordinarily, the arm 29 is readily detachable from the indicator 28 so that the machinist can select, from a standardized kit, the particular arm he wants to use for the particular work at hand or with the selected pair of mating tines 16 and 20.

While the instrument herein disclosed is of particular utility in connection with work being turned in a lathe it should be obvious that it may have utility for other purposes as, for example, the measurement of work being formed on a shaper or being ground on a surface grinder, for example. Obviously, the caliper of the invention may be used with or without the indicator 28, and if and when desired the indicator support rod 32 may be forcibly withdrawn from the bore 31.

Having thus described my invention, I claim:

1. In a measuring and/or checking caliper of the kind having a pair of relatively movable tines with sensing points to encompass a work piece dimension to be measured or checked the improvement characterized in that at least one of said tines is divided into two parts and is provided with a hinged joint for pivotally connecting said two parts whereby one of said sensing points may be moved relative to the other, a positive stop member spanning said hinged joint to limit the approach of said sensing points relatively towards each other to a preset dimension; yieldable means to bias one of said parts towards said preset dimension; a support detachably secured to the other of said parts of said one of said tines; and a dial indicator having a sensing element adjustably carried by said support by means spanning said hinged joint; the arrangement being such that the sensing element of said dial indicator may be moved along the hinged portion of said tine for a substantial distance toward and away from said hinged joint whereby the range and sensitivity of said dial indicator may be varied.

References Cited

UNITED STATES PATENTS

| | | | |
|---|---|---|---|
| 1,109,467 | 9/1914 | Robinson | 33—149 |
| 1,324,870 | 12/1919 | Zito | 33—148 |
| 2,395,154 | 2/1946 | Thulin | 33—148 |
| 2,468,362 | 4/1949 | Fournier | 33—148 |
| 2,514,024 | 7/1950 | Bernard | 33—148 |
| 2,832,150 | 4/1958 | Dienersberger | 33—148 |

WILLIAM D. MARTIN, Jr., *Primary Examiner.*